(12) United States Patent
Desai et al.

(10) Patent No.: US 12,050,801 B2
(45) Date of Patent: Jul. 30, 2024

(54) FAILURE RECOVERY IN A REPLICATION ENVIRONMENT USING A MATRIX CLOCK AND A REPLICATION CONTROLLER

(71) Applicant: Dell Products L.P., Round Rock, TX (US)

(72) Inventors: Keyur B. Desai, Cary, NC (US);
Meeilee Chong, Cary, NC (US);
Abhishek Pareek, Cary, NC (US)

(73) Assignee: DELL PRODUCTS L.P., Round Rock, TX (US)

(*) Notice: Subject to any disclaimer, the term of this patent is extended or adjusted under 35 U.S.C. 154(b) by 77 days.

(21) Appl. No.: 17/813,791

(22) Filed: Jul. 20, 2022

(65) Prior Publication Data

US 2023/0342065 A1 Oct. 26, 2023

Related U.S. Application Data

(63) Continuation-in-part of application No. 17/660,528, filed on Apr. 25, 2022.

(51) Int. Cl.
*G06F 11/00* (2006.01)
*G06F 3/06* (2006.01)
*G06F 11/14* (2006.01)

(52) U.S. Cl.
CPC ............ *G06F 3/065* (2013.01); *G06F 3/0604* (2013.01); *G06F 3/0629* (2013.01); *G06F 3/0658* (2013.01); *G06F 11/1492* (2013.01); *G06F 3/0679* (2013.01); *G06F 11/1461* (2013.01); *G06F 11/1464* (2013.01); *G06F 11/1469* (2013.01); *G06F 11/1471* (2013.01)

(58) Field of Classification Search
CPC ............ G06F 11/1471; G06F 11/1469; G06F 11/1461; G06F 11/1464; G06F 11/1492; G06F 11/0772; G06F 11/1604; G06F 3/065; G06F 3/0604; G06F 3/0629; G06F 3/0658; G06F 3/0679
See application file for complete search history.

(56) References Cited

U.S. PATENT DOCUMENTS

| | | | |
|---|---|---|---|
| 2014/0040206 A1* | 2/2014 | Ramakrishnan | G06F 11/2097 707/674 |
| 2020/0057697 A1* | 2/2020 | Yeung | G06F 11/1466 |
| 2020/0059376 A1* | 2/2020 | Slovetskiy | H04L 12/1877 |
| 2020/0151163 A1* | 5/2020 | Aron | G06F 11/1474 |
| 2021/0018953 A1* | 1/2021 | Ford | G06F 1/10 |
| 2022/0121627 A1* | 4/2022 | Inbar | G06F 16/162 |
| 2022/0253363 A1* | 8/2022 | Zhang | G06F 16/27 |

* cited by examiner

*Primary Examiner* — Elmira Mehrmanesh
(74) *Attorney, Agent, or Firm* — Workman Nydegger

(57) ABSTRACT

One example method includes performing replication operations and/or failure recovery operations for replication operations in a computing system using matrix clocks and replication controllers. The replication controller includes or has access to vectors of a matrix clock. The replication controller also includes a multiplexer. The multiplexer is configured as an m×n multiplexer using the matrix clock to determine m and n. The operation is performed using the configured multiplexer. This allows an imbalance of resources to be managed by the replication controller. The matrix clock can be updated, which may result in the multiplexer being reconfigured.

17 Claims, 10 Drawing Sheets

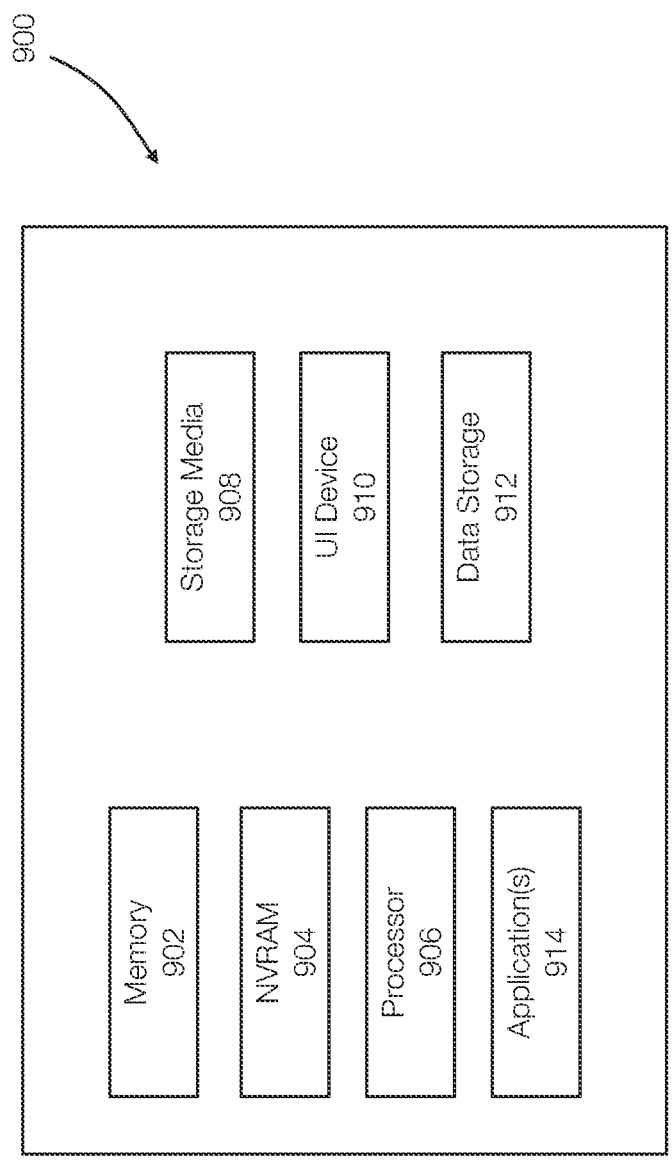

FAILURE RECOVERY IN A REPLICATION ENVIRONMENT USING A MATRIX CLOCK AND A REPLICATION CONTROLLER

RELATED APPLICATIONS

This application is a continuation-in-part of U.S. Ser. No. 17/660,528 filed Apr. 25, 2022, which application is incorporated by reference in its entirety.

FIELD OF THE INVENTION

Embodiments of the present invention generally relate to failure recovery operations. More particularly, at least some embodiments of the invention relate to systems, hardware, software, computer-readable media, and methods for failure recovery operations in systems including distributed systems and to replicating files using a matrix clock and a multiplexer.

BACKGROUND

Distributed systems, including replication environments, may experience different types of failure. For example, replication may be performed using multiple streams or resources in parallel. These distributed systems may fail or experience some level of failure when stream resources are not available on the source and/or the target. When this situation arises, it is necessary to perform a failure recovery operation.

To recover from the failure, it is often necessary to process the failure and restart the job or operation (e.g., replication). More specifically, when the operation is a replication operation is, it is necessary to restart the replication operations from the point of failure. This ensures that the replication operation is properly performed, and that data is successfully replicated without loss.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 9 discloses aspects of a computing device or a computing system.

DETAILED DESCRIPTION OF SOME EXAMPLE EMBODIMENTS

Figure 1:
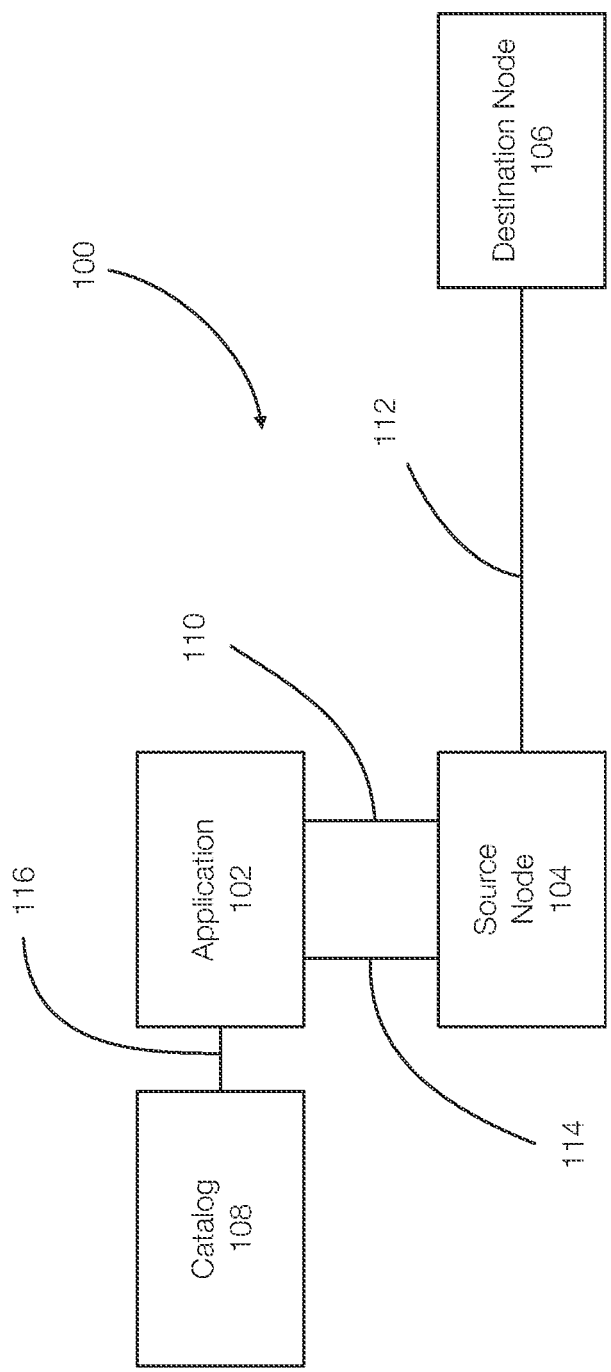
FIG. 1 discloses aspects of a matrix clock in the context of a distributed system.

Embodiments of the present invention generally relate to distributed systems. More particularly, at least some embodiments of the invention relate to systems, hardware, software, computer-readable media, and methods for failure recovery in distributed systems, including failure recovery in replication operations. In general, example embodiments of the invention further relate to distributed and/or scaleout operations, recovery operations, logical clock operations, replication operations, or the like or combination thereof.

In a distributed system, it is often unnecessary to know when an event happened in a global context. This is difficult using physical clocks because synchronizing physical clocks in a distributed system Is expensive and inherently inaccurate. Instead of using a physical time, the order of events may be used as a clock. In some examples, it is only necessary to know the order of certain events, such as those visible to a particular host or node.

Embodiments of the invention relate to a logical or matrix clock and to various operations using a matrix clock. Each host (e.g., node) in a distributed system may be associated with a matrix clock. A matrix clock is a combination of multiple vector clocks. Every time an event occurs, the sending host informs other hosts of what it knows about the global state of time or events and what other hosts have told the sending host about the global state of time or events.

Embodiments of the invention further relate to resource multiplexing using matrix clocks. Resources at both the source and the target are important aspects of performing tasks such as replication. The availability of the resources plays a role in determining how the resources are allocated. In one example, a replication controller is provided that may track point in time resources or resource availability in the replication environment. This allows the resources to be allocated and/or managed more efficiently at both the target and the source and ensures that resources can be allocated when available.

Because resources required/available by a source may not match with resources required/available at a target, there is an imbalance of resources. Embodiments of the invention bridge the imbalance by multiplexing the streams on a source and demultiplexing the streams at the target. In another example, the multiplexer allows the replication controller to throttle the replication such that the resource imbalance is avoided. The configuration of the multiplexer can vary and may depend on the resources available on the source and the target. This allows the multiplexer to have an m×n configuration, where both m and n can be adjusted as resource or stream availability changes. As resources and resource availability changes, there may be situations wherein n may be less than m and situations wherein n is greater than m and situations wherein n=m.

Embodiments of the invention include performing failure recovery operations using a matrix clock. By way of example and not limitation, embodiments of the invention are discussed in the context of failure recovery in replication operations.

FIG. 1 discloses of replication including stream-based replication. Generally, data in the system 100 is replicated from a source node 104 (e.g., cluster, storage device(s), virtual machine, container) to a destination node 106 (or to multiple destination nodes). In one example, the source node 104 and the destination node 106 may be storage devices in the context of a data protection appliance or system. The source node 104 is an example of a source and the destination node 106 is an example of a target or destination.

The data on the source node 104 may be streamed using MFR (managed file replication) streams, Mtree based streams, or the like. To improve replication, multiple streams may be used to stream the data. For example, a 2 GB (gigabyte) file may be replicated using 10 200 MB (megabyte) streams.

More specifically, the system 100 may include an application 102 that is configured to perform replication of the source node 104 to the destination node 106. The application 102 may issue file a copy start command or operation 110. This allows a replication context and/or a secure connection to be established between source node 104 and the destination node 106.

Once the context and connection are established, files may be transferred 112 between the source node 104 and the destination node 106. The status may be monitored using a command such as file copy status.

When the transfer of data is completed 114, a file copy stop command or operation may be sent by the application 102. Next, the catalog 108 is updated 116. In this example, the catalog 108 may identify files such as:

1 copy on source node (file1)
2 copy on destination node (file2)

Thus, the file1 (or other data) has been replicated from the source node 104 to the destination node 106.

As previously suggested, the replication operation may fail for various reasons. One reason relates to the availability of streams. In this example, the source node 104 may be associated with read streams and the destination node 106 may be associated with write streams. The number of read streams on the source node 104 and write streams on the destination node 106 may be limited and may be different. Exceeding these limits may degrade performance. For example, throughput and compression performance may degrade.

In one example, the streams may be associated with a soft limit and a hard limit. Exceeding the soft limits may degrade performance. The hard limit cannot be exceeded. When the soft limit is exceeded, the server (e.g., on which the application 102 resides and operates), may attempt to recycle streams in order to remain under the hard limit. If the hard limit is exceeded, stream recycling may become severe and may impact performance significantly. Often, this generates an alert such as "too many streams open".

Mtree streams may be associated with a maximum number of contexts that can be created. This limit may be enforced and cannot be exceeded. For MFR streams, the limits may not be enforced.

This problem can become more acute in the context of automatic multi-streaming (AMS) optimizations. AMS optimizations use multiple streams to send data from the source node 104 to the destination node 106. For instance, a large file is split into smaller file segments and the file segments are each transferred from the source node 104 using different streams. The segments are reassembled at the destination node 106.

By way of example, embodiments of the invention allow an application to be unaware of the streams running out on the source or the destination, allow replication operations to recover from out of stream failure and resume operation from the point of failure automatically, and/or provide self-healing.

Embodiments of the invention use a logical matrix clock to keep point in time state of the resource (stream allocation) and the progress of a replication operation. When failure occurs or is detected, a recovery line can be quickly established. The recovery line can be used, when streams are available, to recover from the failure from the appropriate point.

More specifically, a logical or matrix clock can be used to determine the order of events. Causality (causation or cause and effect) describes the manner in which one event, process, state or object (the cause) contributes to the production of another event, process state or object (the effect). The cause is partly responsible for the effect and the effect is partly dependent on the cause. In general, a process or operation has many causes (causal factors), which are all in the past. An effect can, in turn, be a cause of or a causal factor for other effects, which are all in the future. The cause and effect can be understood, at least in part, using a matrix clock.

A matrix clock is a mechanism to capture chronological and causal relationships in a distributed system. A matrix clock maintains a vector of the matrix clocks for each communicating node. Each time a message is exchanged, which may be in response to an event, the sending node sends not only what it knows about the global state of time, but also the state of time that the sending node received from other nodes in the distributed system.

Figure 2:
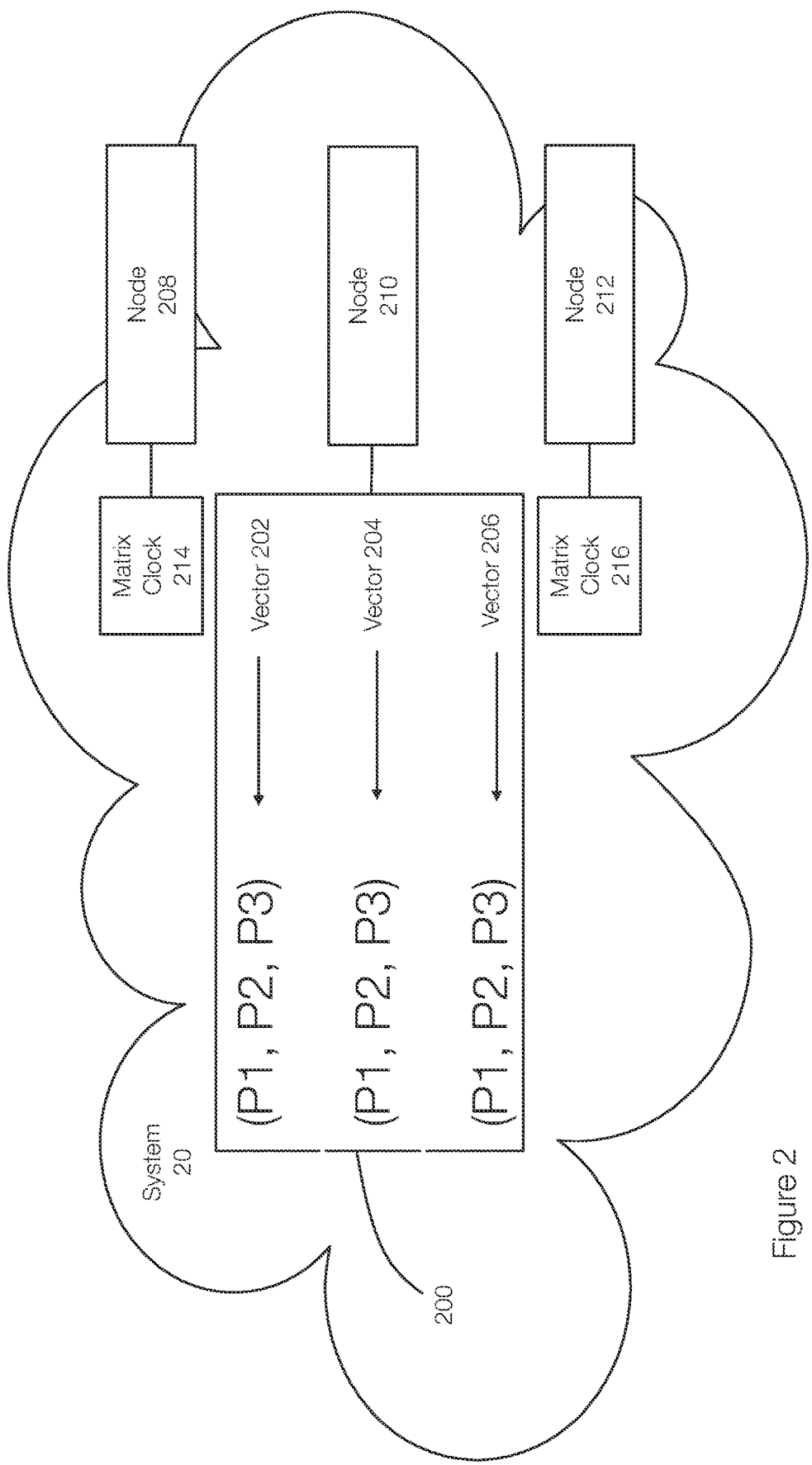
FIG. 2 discloses aspects additional aspects of a matrix clock.
Figure 3:
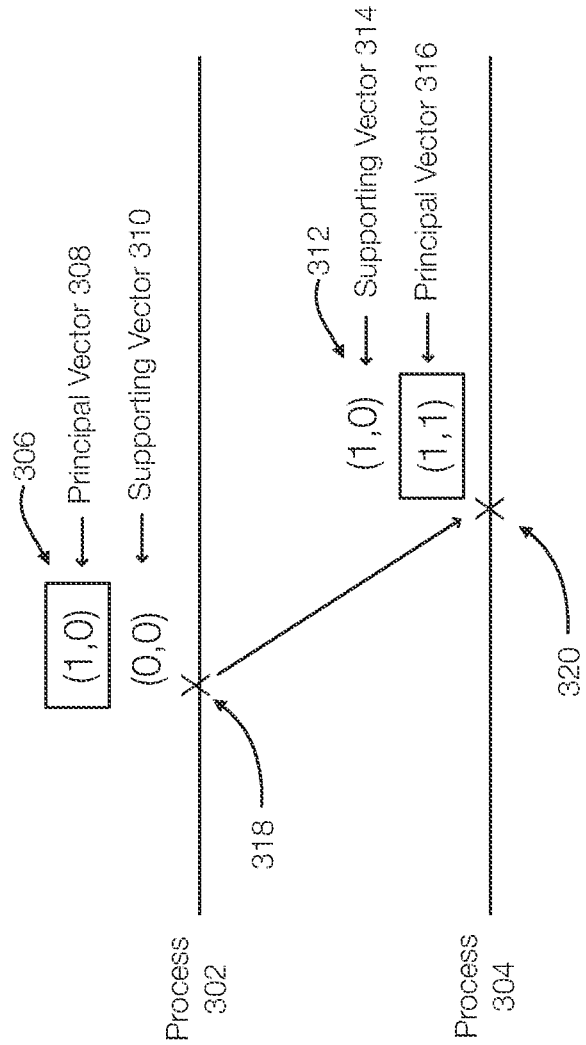
FIG. 3 discloses aspects of managing matrix clocks in a distributed system.
Figure 4:
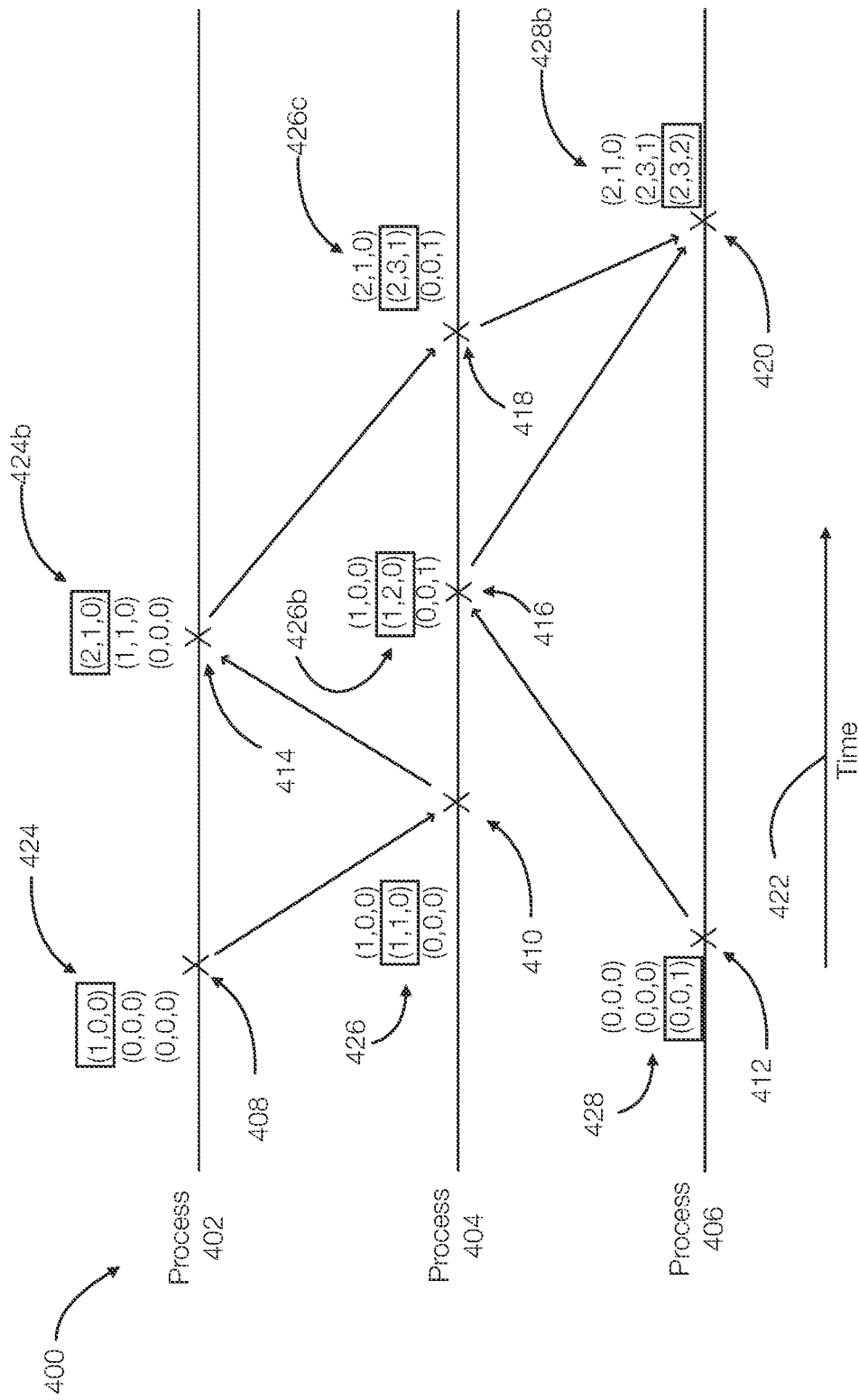
FIG. 4 discloses aspects of a failure recovery operation in a distributed system using matrix clocks.
Figure 5:
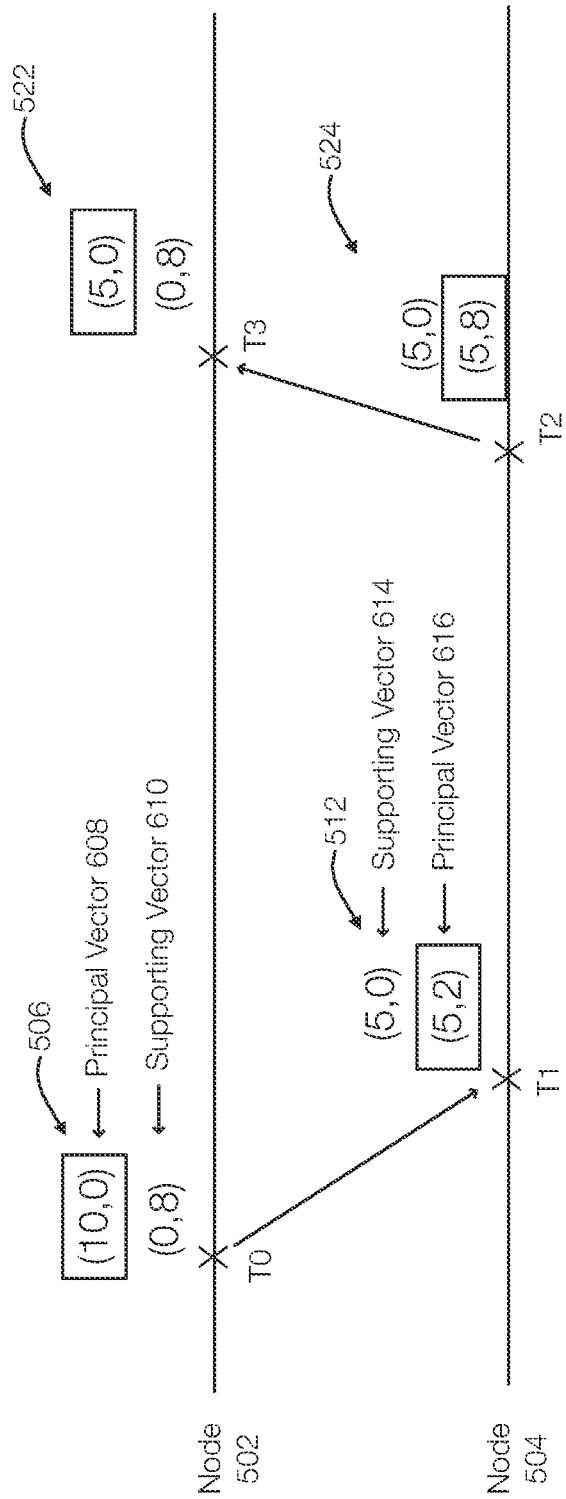
FIG. 5 discloses aspects of a matrix clock in replication operations and failures in replication operations.

FIGS. 2-4 describe matrix clocks in the contest of nodes and events or in a more general manner. FIG. 5 describes a matrix clock specific to a replication operation.

FIG. 2 discloses aspects of a matrix clock in a distributed computing system. FIG. 2 illustrates an example of a matrix clock 200 by way of example and not limitation. In this example, the system 20 includes at least three nodes 208, 210, and 212. Each of the nodes 208, 210, 212 represents a server, a virtual machine, a container, a machine, a process or the like. The nodes 208, 210, and 212 are part of a distributed computing system 20. The system 20 may be implemented on-site, in a cloud system, a datacenter, multiple cloud systems, or the like or combination thereof.

The matrix clock 200 is associated with the node 210. The nodes 208 and 212 are also associated with, respectively, matrix clocks 214 and 216. The contents of the matrix clock 200 may be different from the content of the matrix clocks 214 and 216.

The matrix clock 200 is representative of all matrix clocks in the system 20. Generally, the matrix clock 200 includes an entry for each node in the system 20. Thus, the size or number of entries in the matrix clock 200 may change as nodes are added/removed from the system 20. However, the matrix clock 200 may also retain information for removed nodes at least for some period of time.

In this example, matrix clock 200 pertains to the node 210. The matrix clock 200 includes a principal vector 204 and supporting vectors 202 and 206. The supporting vectors are principal vectors from the other nodes 208 and 212. However, the supporting vectors in the matrix clock 200 may not reflect the contents of the actual principal vector for the corresponding node. More specifically, the vector 202 corresponds to a principal vector in the matrix clock 214. However, the actual values in the principal vector of the matrix clock 214 may differ from the values in the vector 202.

Depending on the events in the system 200, the number of supporting vectors may vary and the values stored in each of the vectors can change. For example, the vector 206 may be missing or empty in the matrix clock 200 until the node 212 communicates with the node 210 (e.g., in response to an event at the node 212 such as a replication operation).

Each position in a vector pertains to one of the other nodes. Thus, the vector 202 includes an entry for each of nodes 208, 210, and 212 represented, respectively, by P1, P2 and P3. The other vectors are similarly configured. Each vector in each matrix clock has an entry for the nodes in the computing system in one example. By way of example and not limitation, the vectors in the matrix clock are arranged in an order that may reflect the manner in which nodes were added to the distributed system. Thus, the matrix clock 200 indicates that the node 208 was the first node. The nodes 210 and 212 were subsequently added to the distributed system 20.

FIG. 3 illustrates an example of matrix clocks configured to capture chronological and/or causal relationships in a distributed system. FIG. 3 illustrates a process 302 and a process 304. The process 302 may be operating on a node (e.g., a server, virtual machine, container) and the system may perform a replication to a new node. The node is added and the process 304 is executed on the newly added node. Thus, the process 302 (instantiated on a source node or a server accessing the source node) may be configured to transfer or replicate data from a source node. The process 304 may operate on the destination node (or a server controlling the source node) and be configured to write data received from the source node or from the process 302.

The process 302 is associated with a matrix clock 306, which includes a principal vector 308 and a supporting vector 310. In this example, the principal vector 308 is (1,0). The "1" represents an event 318 for the process 302. The "0" in the vector 308 indicates that the process 302 has not received any events or messages from the process 304.

The supporting vector 310 for the process 302 is (0,0). The 0s indicate that there are no events on the process 304 or messages from the process 304 that the process 302 is aware of.

In this example, an event 318 occurs (e.g., a snapshot) with respect to the process 302 and is communicated to the process 304. The matrix clock 312 is thus updated. The process 304 also experiences an event 320 (e.g., a snapshot) that is later in time than the event 318. As a result of these events, the matrix clock 312 is updated. For example, the supporting vector 314 is updated to (1,0). This represents the global state of the process 302 carried over to the process 304 during transition. Thus, the supporting vector 314 is a copy of the principal vector 308 that was received from the process 302. Subsequent changes to the principal vector 308 may or may not be communicated to the process 304 or updated in the matrix clock 312.

In this example, the principal vector 316 for the process 304 is updated (1,1). The first "1" represents an event (e.g., the event 318) that has been communicated to the process 304 from the process 302. The second "1" in the principal vector 316 represent the event 320 with respect to the process 304.

In effect, the principal vector 308 of a particular node (or process) represents the corresponding node's event and the events of the other nodes that the particular node is aware of. The supporting vectors represent similar information about other nodes that the particular node is aware of. As a result, the clocks at each of the nodes may differ in their content and may depend on which nodes communicated (or transitioned) which events to which nodes.

The arrows between events in FIG. 3 represent, by way of example only, transitions. With regard to FIG. 3, it is assumed that only process 302 is online and a snapshot (event 318) is performed. The time at which the event 318 occurs is identified in the matrix clock 306. At a later time, the process 304 joins the system, which may be a cluster. When the process 304 (or node) joins the system, a snapshot of the process 304 is performed—the event 320. The transition between the snapshot or event 318 and the snapshot or event 320 is identified by the arrows, with a matrix clock at each end of the transition, which matrix clock identifies the change.

FIG. 4 discloses aspects of a matrix clock configured to capture casual and/or chronological relationships in a distributed system. FIG. 4 illustrates a system 400 that includes more nodes or processes compared to FIG. 3. FIG. 4 illustrates processes 402, 404, and 406. The process 402 (process p1) experiences events 408 (event e1) and 414 (event e2). These process/events may be referred to as p1e1 and p1e2. The process 404 similarly experiences events 410, 416, and 418, also referred to as p2e1, p2e2, and p2e3. The process 406 experience events 412 and 420, also referred to as p3e1 and p3e2.

FIG. 4 also illustrates a matrix clock for each of the processes 402, 404, and 406 at different points in time. Thus, the clock 424b reflects the contents of the clock 424 at a later point in time. Similarly, the clocks 426b and 426c represent the contents of the clock 426 at later points in time and the clock 428b represents the contents of the matrix clock 428 at a later point in time.

The arrows in FIG. 4 represent transitions and may represent causal relationships. The arrows may also represent messages. For example, the process 402 experiences an event 408 and sends a message to the process 404 or there is a transition to the process 404. The message or transition allows the matrix clock associated with the process 404 to be updated accordingly as discussed below.

FIG. 4 illustrates, with regard to time 422, that the matrix clock 424 associated with the process 402 changes at event 408 (p1e1) and at event 414 (p1e2). The matrix clock 426 associated with the process 404 changes at events 410 (p2e1), 416 (p2e2), and 418 (p2e3). The matrix clock 428 associated with the process 406 changes at the events 412 (p3e1) and 420 (p3e2). The principal vectors in the matrix clocks are outlined in a box for each of the processes.

At event 408 or p1e1, the principal vector in the clock 424 is changed to (1,0,0) reflect the event on the process 402. This event 408 transitions to the process 404. The process 404 then experiences an event 410 (p2e1). The principal vector in the matrix clock 426 is updated to (1,1,0) and the supporting vector corresponding to the process is 402 is updated to (1,0,0). In other words, the matrix clock 404 reflects the state of the process 402 in its matrix clock 426 that is known to the process 404.

A transition is then made to process 402 and an event 414 occurs. The principal vector in the matrix clock 424b at event 414 is updated to (2,1,0). The 2 in the principal vector of the clock 424b reflects that this is the second event for the process 402 and the 1 reflects that the process 402 is aware of event 410 or the first event on the process 404.

Process 406 experiences an event 412 and the principal vector in the matrix clock 428 is changed to (0,0,1). This reflects the event 412 at the process 406 itself. At this point, the process 406 is not aware of any state of the other processes 402 and 404. Thus, the supporting vectors at the event 412 for the processes 402 and 404 are each (0,0,0). The matrix clock 428 at the time of the event 412 is illustrates that the process 406 is unaware of events on the processes 402 and 404.

When the event 416 occurs, after a transition from the event 412, the matrix clock 426*b* is updated. The supporting vector for process 402 in the clock 426*b* does not change. The principal vector is updated to (1,2,0) to reflect the second event for the process 404 and the supporting vector for the process 406 in the matrix clock 426*b* is updated to reflect the state of the process 406 known by the process 404.

Next, the event 418 occurs, which is related to a transition from the process 402. In this case, the principal vector is updated to (2,3,1) in the matric clock 426*c* and the supporting vector for the process 402 in the matric clock 426*c* is updated to (2,1,0). The supporting vector for the process 406 is unchanged at (0,0,1) because the transition did not occur from the process 406 but was from the process 402.

The last event illustrated in FIG. 4 with respect to time 422 is the event 420. Thus, the primary vector of the matrix clock 428*b* is updated to reflect that this is the second event of the process 406 to (2,3,2). The supporting vectors in the matrix clock 428*b* are updated as discussed.

FIG. 4 illustrates that the matrix clock or clocks can capture chronological relationships as well as causal relationships. Chronological relationships can be captured without using timestamps and without having to synchronize physical clocks across different devices or nodes. The matrix clocks can be used to determine a recovery line for a system such as a distributed system.

FIG. 5 discloses aspects of a matrix clock specifically configured for a replication operation. FIG. 5 illustrates a replication operation where the node 502 is the source node and the node 504 is the destination node. In this example, the number of streams available for each node is stored in the primary or principal vector. The matrix clock 506 illustrates that the node 502 has 10 streams available. These are read streams in this example because the node 502 is the source node for the replication operation. This example also assumes that an application is transmitting a file of size 20 GB from the node 502 to the node 504 in chunks of 2 GB each. As a result, 10 streams are required. This example also assumes that the node 502 has 10 streams as resources and that the node 504 has 8 streams for resources. Exceeding these limits may adversely impact performance.

Before the file is transmitted, the matrix clock 506 is consulted at time T0 to determine the number of streams available at the node 502 and at the node 504. The matrix 506 suggests, as illustrated in the principal vector 608, that the source node 502 has 10 streams available. The supporting vector 610 in the matrix 506 suggests that the node 504 has 8 streams available.

At time T0, the node 502 may send 5 streams to the node 504. The remaining 5 streams may be put in a queue and scheduled for replication at a later time. The matrix clock is updated. The matrix clock may also be associated with information related to the remaining files in the queue.

At time T1, the matrix clock 512 indicates that, of the 5 streams requested by the node 502, only 2 are available at the node 504 as illustrated in the principal vector 616. The other streams (6 streams) of the node 504 may be in use with another node that is not illustrated in this example. Stated differently, the matrix clock 512 indicates that of the 8 streams provided by the node 504, only 2 of the streams are available.

Typically, this situation would result in an out of stream error and impact performance. The node 504 will automatically take action to prevent the out of stream error. Stated differently, the node 504 takes actions to ensure that the impact on performance, if any, is reduced or minimized, while ensuring that the replication operation is performed.

In one example, the node 504 may throttle (e.g., not attempt to serve the streams) until all of the requested streams are available. This avoids stream thrashing. In another example, the node 504 may serve 2 of the streams. If the node 504 allows 2 of the streams, the node 504 may throttle with respect to the remaining 3 streams until sufficient streams are available. Alternatively, the node 504 may simply allocate a stream to the request from the node 502 as the stream becomes available.

In one example, the node 504 throttles if all of the requested streams are not available. At time T2, the matrix clock 524 (which is the matrix clock 512 at time T2) indicates that 8 streams are available at the node 504 and that the node 502 requires 5 streams. As a result, the replication from the node 502 to the node 504 can be performed for those 5 streams and the streams can then be released.

At time T3, the initial 5 replication streams have been processed at time T2. Thus, 10 GB of data has been replicated (5 streams×2 GB). The matrix clock 522 (which is the matrix clock 506 at a later time T3) indicates that there are still 5 streams to process and that 8 streams are available at the node 504. In this example, the remaining 5 streams are replicated to the node 504 from the node 502. FIG. 5 illustrates timelines of nodes in a cluster and the corresponding matrix clock transitions.

When failure occurs in a replication system or when a potential failure is detected (e.g., not enough streams at the destination to service the request from the source), the destination node can by throttled and the replication operation can be stalled or queued until the matrix clock indicates that sufficient streams are available. In one example, the matrix clock may be queried. Alternatively, any update to a matrix clock may be propagated to other nodes.

A recovery line can be established such that, when the streams are available, the replication operation can proceed from the failure recovery line. Stated differently, the destination node can resume the replication operation when the number of streams available is greater than or equal to the number of streams required by the source.

Figure 6:
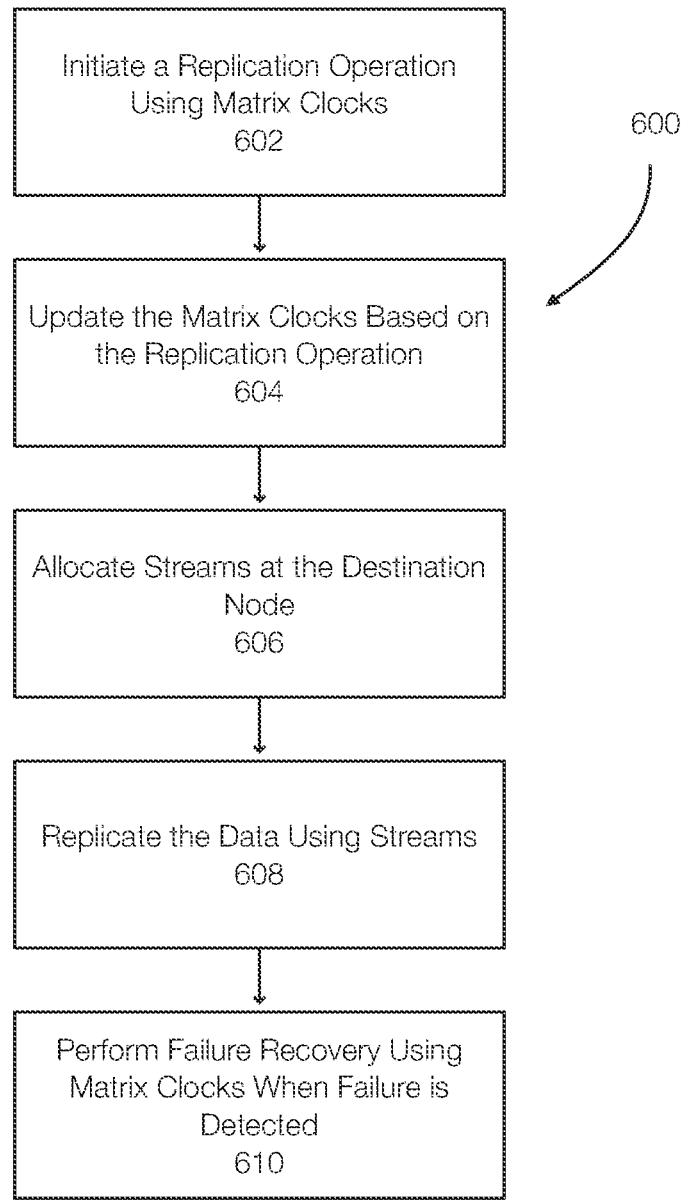
FIG. 6 discloses aspects of a method for performing replication operations and/or recovering from failure in replication operations.

FIG. 6 discloses aspects of performing a replication operation and/or recovering from failure. The method 600 may include initiating 602 a replication operation between a source and a destination. The source and the destination may each be associated with a matrix clock. The matrix clocks are updated 604 based on the replication operation. For example, a source (e.g., a source node or server) may need 10 streams to replicate data. However, the source may request a number of streams equal to or less than the needed number of streams. The request may be based, in part, on the number of streams available at the destination node. A source node needing 10 streams may request any amount up to the number of streams actually available on the destination based on the information in the source's matrix clock. If the actual number of streams available at the destination is lower, then a failure may occur, and the destination node will throttle.

Thus, streams are allocated 606 at the destination node. As previously stated, this may include allocating all of the requested streams, a portion of the requested streams, or none of the requested streams until the request as a whole can be granted.

Once streams are available and allocated, the data is replicated 608 using streams. If a failure occurs (e.g., not enough streams available), the destination node may throttle the streams or the replication. Once the replication is completed, a catalog may be updated such that the catalog identifies which nodes contain a copy of the data that has been replicated.

With respect to the replication operation, the replication request may be viewed as an event and, when the event occurs, matrix clocks at both the source node and the destination node are updated. More specifically, the principal vector at the node at which the event occurred is updated to reflect the event. The supporting vector at the node that receives the event is updated.

When an error is detected or for another reason, a failure recovery is performed 610 using the matrix clocks. The matrix clocks provide a chronological and causal view of the system that allows a recovery line to be determined. Thus, the system can identify the state of the replication and ensure that the data is replicated appropriately and accurately.

Figure 7A:
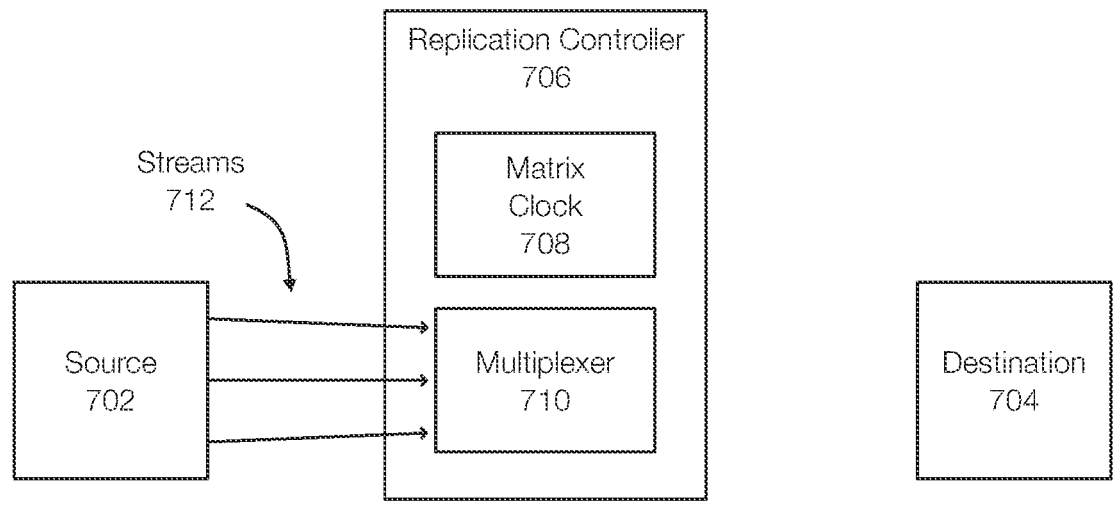
FIG. 7A discloses aspects of performing an operation such as a replication operation using a matrix clock and a multiplexer.
Figure 7B:
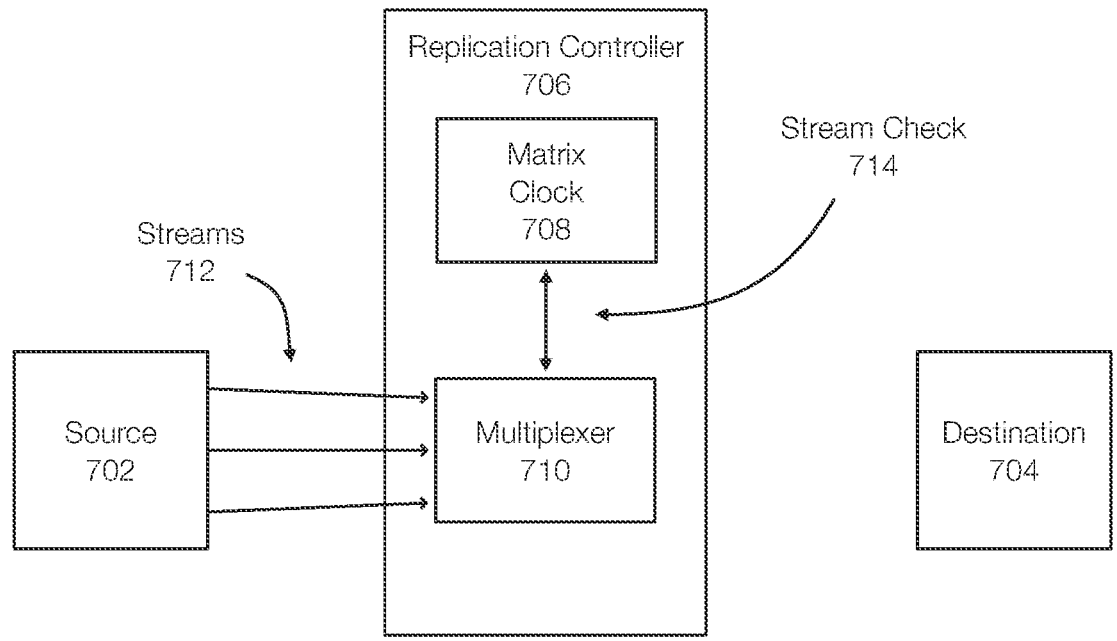
FIG. 7B discloses additional aspects of performing an operation such as a replication operation using a matrix clock and a multiplexer.
Figure 7C:
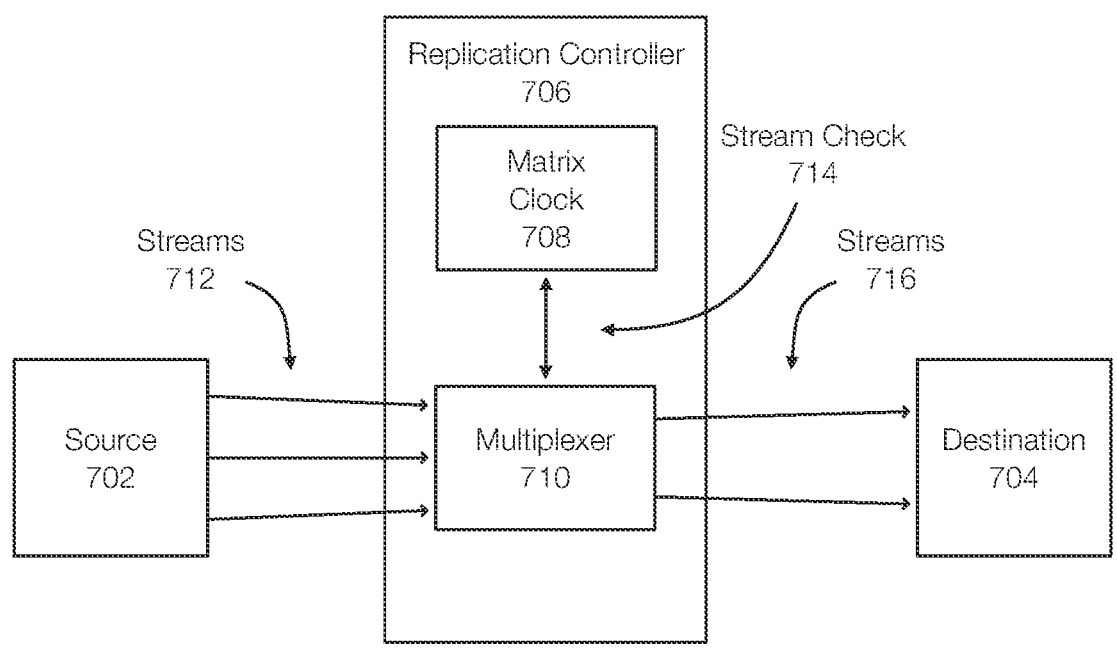
FIG. 7C discloses further aspects of performing an operation such as a replication operation using a matrix clock and a multiplexer.

FIGS. 7A, 7B and 7C are discussed in sequence and illustrate different points of multiplexed replication based on a logical or matrix clock. FIGS. 7A, 7B, and 7C disclose aspects of matrix clocks and multiplexers for resource allocation and resource management for both a source and a destination or target in an environment, which may be a replication environment. FIGS. 7A-7C also relate to failure recovery as disclosed herein.

In replication environments, the number of streams that can be allocated depends on the resources that are available. The number of streams that can be used for replication may vary and change over time. Further, the resources available at a source may differ from the resources available at the target. Embodiments of the invention improve replication and help avoid replication errors by adapting to these changes more quickly.

A replication controller is provided that used the matrix clock to control or set the m×n configuration of a multiplexer. Using a multiplexer whose configuration may be controlled or determined allows resource usage and resource allocation to be managed more effectively. In general, a multiplexer allows the streams available on the source to the mapped to the streams available on the destination. The mapping, m×n, may depend on the matrix clock and may be changed as resource availability on the source and destination change. As the replication controller becomes aware of changes in the matrix clock, the configuration of the multiplexer may be updated.

In example embodiments, transitions or messages between nodes (or processes), such as between a source and a destination or target, may impact or change the matrix clock or vectors therein. The vector of a particular node may change for other reasons as well. In one example, the vectors in the matrix clock may update with every message or for other reasons.

The replication controller may poll the matrix clocks of nodes in the replication environment or have access to the matrix clocks maintained by the nodes in the system. For example, when transferring data between a source and a destination, the matrix clock used by the replication controller may rely on the vectors of the source and the destination as known by, respectively, the source and destination. The replication controller can use the updated matrix clock to configure the multiplexer such that resources are allocated in accordance with resources available at the relevant processes or nodes.

In one example, the replication controller may operate on a source node or a destination node. The replication controller may operate separately on another node or virtual machine. The replication controller may be instantiated for each replication. In one example, the replication controller may include the vectors for the source and the destination. In another example, the replication controller may include vectors for all nodes or processes in the system. The replication controller may use the vectors relevant to the source and the destination to manage or allocate resources accordingly for an operation from the source to the destination.

In FIG. 7A, a replication controller 706 is illustrated. The replication controller 706 is configured to improve resource utilization using a multiplexer 710 and a matrix clock 708. The matrix clock 708 may be the matrix clock of the source, the destination, and/or other nodes in the environment and/or a combination thereof. In one example, the matrix clock 708 may be generated from the matrix clocks of the source 702 and the destination 704. This allows the replication controller 706 to be aware of changes is resource availability at both the source 702 and the destination 704.

The multiplexer 710 may be repeatedly configured or reconfigured based on updates from or to the matrix clock 708. As the streams available at the source 702 and the destination 704, this information is reflected in the matrix clock 708 and the configuration of the multiplexer 710 may be changed accordingly. This allows the replication controller 7606 to configure the multiplexer 710.

Assume, for example, that the source sends a request for streams 712. IN this example, the source 702 may need to replicate 50 files, but requests 20 streams. The request for the streams 712 is received at the multiplexer 710—not the destination 704.

After receiving the request for streams 712, FIG. 7B illustrates that the multiplexer 714 may perform a stream check 714 to determine the available number of streams on the destination 704. In this example, the stream check 714 may determine that 5 streams are available at the destination 704 from the matrix clock 708. The replication controller 706 may determine that 5 streams are available at the destination 704.

FIG. 7C illustrates that the multiplexer 710 is configured in an m×n (20×5 in this example) configuration that multiplexes the 20 streams 712 to the 5 streams 716. As messages, transitions, or the like impact the resources of the streams available at the destination 704 and/or the source 702, the matrix clock 708 is updated to reflect the current resource availability. Similarly, the replication controller 706 responds to changes in the matrix clock 708 by changing the configuration of the multiplexer 710. In the current example, if 5 more streams were available on the destination, the configuration of the multiplexer 710 would change from 20×5 to 20×10.

The replication controller 706 may be configured to adapt the multiplexer 710 to various configurations. For example, the multiplexer 710 may be configured in a 1×n configuration based on available streams at the source 702 and the destination 704. The source 702 or the multiplexer, however, may be able to use the single stream for multiple files, which may normally each require a separate stream.

If the source 702 has 5 files to transmit to the destination and 1 stream is available at the source 702, the 5 files may be serialized on the available stream. Any number of the n streams may be used in this example. This may be particularly suitable when the files to be transmitted from the source are small. For example, if 5 files whose size is less than 10 KB (kilobytes) need to be transferred and only 1 stream is available, the source 702 or the replication controller 706 may serialize these five files to be transmitted over the single stream. This may reduce the number of remote procedure calls (RPCs) to the destination 704.

In another example, the resources reflected in the matrix clock 708 may result in a multiplexer configuration of m×1. This may allow, by way of example, a 200 GB file to be parsed or segmented into 200 MB chunks that are transmitted over 5 streams and serialized into a single stream on the output of the multiplexer 710. This allows the streams or other resources of the source 702 to be used effectively.

More generally, the configuration of the multiplexer may be m×n. In this example (and in the other examples), replication controller 706 may act as a throttle. In the case wherein 20 streams are requested by the source and 5 streams are available at the destination (a 20×5 multiplexer configuration), the replication controller 706 uses the multiplexer 710 to transmit 5 streams at a time until all files have been transmitted.

In one example, each of the 5 files may be chunked and consume 4 streams at the source such that 5 files use the 20 available streams. In another example, the streams are throttled at the replication controller such that 5 streams (the number available at the destination) are transmitted at a time. This may allow the other 15 streams of the source to be available to other processes.

FIG. 7A-7C illustrate that the logical or matrix clock 708 and the multiplexor 710 allow resources or streams on the source to be correctly and dynamically mapped to streams or resources on the destination. The replication controller 706 introduces a proactive aspect of resource allocation and actively manages the replication of files from a source to a destination. The imbalance of resources that may exist between a source and a destination can be managed effectively.

The multiplexing and demultiplexing may occur in different manners. For example, a single stream may be used to transmit multiple files. In this case, the stream includes a serialization of the multiple files. In one example, the source may generate the single stream. The single stream may include information that allows the separate files to be identified (e.g., offsets) and transmitted over 5 streams. The multiplexer may send the single stream to the destination over multiple streams. The destination may be configured to extract the files from the streams based on information included in the streams.

Figure 8:
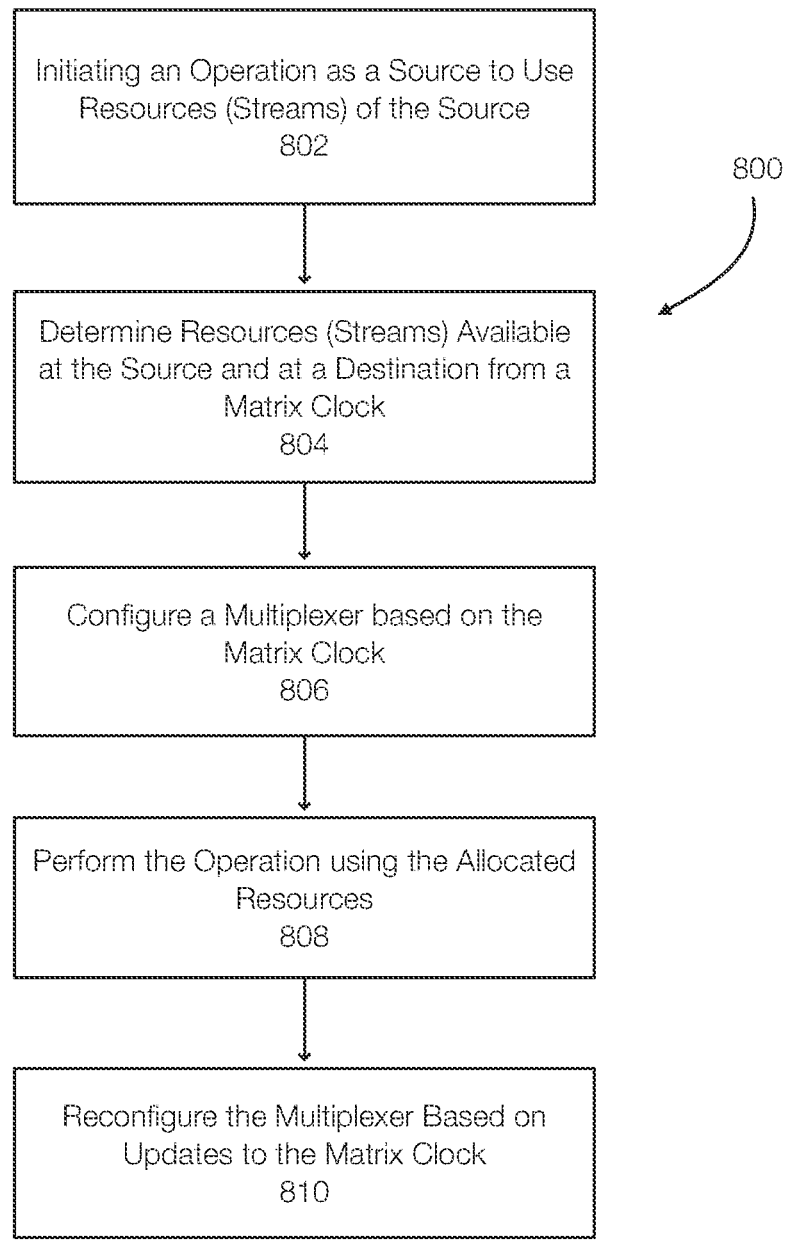
FIG. 8 discloses aspects of a method for replicating files using a replication controller that includes or has access to a matrix clock and a multiplexer.

FIG. 8 discloses aspects of performing data protections operations, which may include replication operations. In the method 800, an operation may be initiated 802 at a source to use resources (e.g., streams) of the sources. The operation may require or requires a certain number of streams. A replication controller may determine 804 the streams available at the source and at the destination using a matrix clock.

Once the number of streams available at the source and at the destination are determined, the replication controller may configure 806 a multiplexer based on the matrix clock. The multiplexer may be configured as an m×n configuration. However, the m×n configuration may not match the resources needed by the operation. This allows the replication controller to throttle at the replication controller and/or to handle the resources in a different manner. As previously discussed, for example, when only 1 stream is available at the source, multiple files may be transmitted over the same stream.

Once the multiplexer is configured, the operation is performed 808 using the allocated resources. As the matrix clock is updated, which may occur during execution of the operation, the multiplexer may be reconfigured 810 accordingly. This allows the operation to dynamically adapt to changes in the resources available at the source and/or destination.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM), or containers.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: initiating a replication operation to replicate data from a source node to a destination node, wherein the replication operation needs x number of streams to replicate the data, updating a matrix clock associated with a replication controller such that the replication controller knows a number of streams available (m streams) at the source node and a number of streams (n streams) available at the destination node, configuring a multiplexer operated by the replication controller as an m×n multiplexer based on the matrix clock, and replicating the data using the m streams to the destination node via the multiplexer.

Embodiment 2. The method of embodiment 1, wherein m is less than n, further comprising serializing multiple files of the data into the m streams such that the multiple files are received at the multiplexer over the m streams and transmitted to the destination node using the n streams.

Embodiment 3. The method of embodiment 1 and/or 2, wherein m is 1 and the multiple files are serialized into a single stream.

Embodiment 4. The method of embodiment 1, 2, and/or 3, wherein m is greater than n, further comprising chunking a file of the data such that the file is received using the m streams and transmitted to the destination node using the n streams.

Embodiment 5. The method of embodiment 1, 2, 3, and/or 4, wherein n is 1.

Embodiment 6. The method of embodiment 1, 2, 3, 4, and/or 5, further comprising updating the matrix clock available to the replication controller based on a vector of the source node and/or a vector of the destination node.

Embodiment 7. The method of embodiment 1, 2, 3, 4, 5, and/or 6, further comprising reconfiguring the multiplexer as a q×r multiplexer to reflect a change in the streams available at the source and/or the streams available at the destination and continuing the operation using the q streams and the r streams.

Embodiment 8. The method of embodiment 1, 2, 3, 4, 5, 6, and/or 7, further comprising throttling the operation at the replication controller when a number of streams needed for the replication operation is larger than m, wherein throttling includes using streams from the m streams that become available to service streams needed by the replication operation that have not been serviced.

Embodiment 9. The method of embodiment 1, 2, 3, 4, 5, 6, 7, and/or 8, further comprising instantiating the replication controller on the source node, the destination node, or a different node.

Embodiment 10. The method of embodiment 1, 2, 3, 4, 5, 6, 7, 8, and/or 9, wherein the matrix clock includes a vector of the source node and a vector of the destination node.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 9, any one or more of the entities disclosed, or implied, by the Figures and/or elsewhere herein, may take the form of, or include, or be implemented on, or hosted by, a physical computing device, one example of which is denoted at 900. As well, where any of the aforementioned elements comprise or consist of a virtual machine (VM) or a container, that VM or container may constitute a virtualization of any combination of the physical components disclosed in FIG. 9.

In the example of FIG. 9 the physical computing device 900 includes a memory 902 which may include one, some, or all, of random-access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid-state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   initiating a replication operation to replicate data from a source node to a destination node, wherein the replication operation needs x number of streams to replicate the data;
   updating a matrix clock associated with a replication controller such that the replication controller knows a number of streams available (m streams) at the source node and a number of streams (n streams) available at the destination node;
   configuring a multiplexer operated by the replication controller as an m×n multiplexer based on the matrix clock; and
   replicating the data using the m streams to the destination node via the multiplexer, wherein replicating the data comprises:
      serializing multiple files of the data into the m streams such that the multiple files are received at the multiplexer over the m streams and transmitted to the destination node using the n streams when m is less than n; and
      chunking a file of the data such that the file is received using the m streams and transmitted to the destination node using the n streams when m is greater than n.

2. The method of claim 1, wherein m is 1 and the multiple files are serialized into a single stream.

3. The method of claim 1, wherein n is 1.

4. The method of claim 1, further comprising updating the matrix clock available to the replication controller based on a vector of the source node and/or a vector of the destination node.

5. The method of claim 4, further comprising reconfiguring the multiplexer as a q×r multiplexer to reflect a change in the streams available at the source and/or the streams available at the destination and continuing the operation using the q streams and the r streams.

6. The method of claim 1, further comprising throttling the operation at the replication controller when a number of streams needed for the replication operation is larger than m, wherein throttling includes using streams from the m streams that become available to service streams needed by the replication operation that have not been serviced.

7. The method of claim 1, further comprising instantiating the replication controller on the source node, the destination node, or a different node.

8. The method of claim 1, wherein the matrix clock includes a vector of the source node and a vector of the destination node.

9. A non-transitory storage medium having stored therein instructions that are executable by one or more hardware processors to perform operations comprising:
   initiating a replication operation to replicate data from a source node to a destination node, wherein the replication operation needs x number of streams to replicate the data;
   updating a matrix clock associated with a replication controller such that the replication controller knows a number of streams available (m streams) at the source node and a number of streams (n streams) available at the destination node;
   configuring a multiplexer operated by the replication controller as an m×n multiplexer based on the matrix clock; and
   replicating the data using the m streams to the destination node via the multiplexer, wherein replicating the data comprises:
      serializing multiple files of the data into the m streams such that the multiple files are received at the multiplexer over the m streams and transmitted to the destination node using the n streams when m is less than n; and
      chunking a file of the data such that the file is received using the m streams and transmitted to the destination node using the n streams when m is greater than n.

10. The non-transitory storage medium of claim 9, wherein m is 1 and the multiple files are serialized into a single stream.

11. The non-transitory storage medium of claim 9, wherein n is 1.

12. The non-transitory storage medium of claim 9, further comprising updating the matrix clock available to the replication controller based on a vector of the source node and/or a vector of the destination node.

13. The non-transitory storage medium of claim 12, further comprising reconfiguring the multiplexer as a q×r multiplexer to reflect a change in the streams available at the source and/or the streams available at the destination and continuing the operation using the q streams and the r streams.

14. The non-transitory storage medium of claim 9, further comprising throttling the operation at the replication controller when a number of streams needed for the replication operation is larger than m, wherein throttling includes using streams from the m streams that become available to service streams needed by the replication operation that have not been serviced.

15. The non-transitory storage medium of claim 9, further comprising instantiating the replication controller on the source node, the destination node, or a different node.

16. The non-transitory storage medium of claim 9, wherein the matrix clock includes a vector of the source node and a vector of the destination node.

17. A method comprising:
   initiating a replication operation to replicate data from a source node to a destination node, wherein the replication operation needs x number of streams to replicate the data;
   updating a matrix clock associated with a replication controller such that the replication controller knows a number of streams available (m streams) at the source node and a number of streams (n streams) available at the destination node;
   configuring a multiplexer operated by the replication controller as an m×n multiplexer based on the matrix clock;
   replicating the data using the m streams to the destination node via the multiplexer;
   updating the matrix clock available to the replication controller based on a vector of the source node
   reconfiguring the multiplexer as a q×r multiplexer to reflect a change in the streams available at the source and/or the streams available at the destination and continuing the replication operation using the q streams and the r streams.

* * * * *